United States Patent
Surcouf et al.

(10) Patent No.: US 10,158,973 B1
(45) Date of Patent: Dec. 18, 2018

(54) INFORMATION-CENTRIC NETWORKING (ICN) TECHNIQUES FOR FACILITATING THE SHARED TRANSPORT OF PASSENGERS OR ITEMS

(71) Applicant: Cisco Technology, Inc., San Jose, CA (US)

(72) Inventors: Andre Surcouf, St. Leu la Foret (FR); Thierry Gruszka, Le Raincy (FR); Hugo Latapie, San Jose, CA (US); Ronnie Dan, San Jose, CA (US); Enzo Fenoglio, Issy-les-Moulineaux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/662,082

(22) Filed: Jul. 27, 2017

(51) Int. Cl.
| | |
|---|---|
| *H04W 4/02* | (2018.01) |
| *H04L 29/08* | (2006.01) |
| *G08G 1/123* | (2006.01) |
| *H04W 88/02* | (2009.01) |
| *H04W 4/04* | (2009.01) |

(52) U.S. Cl.
CPC ............ *H04W 4/023* (2013.01); *G08G 1/123* (2013.01); *H04L 67/18* (2013.01); *H04L 67/12* (2013.01); *H04W 4/046* (2013.01); *H04W 88/02* (2013.01)

(58) Field of Classification Search
CPC ..... H04W 40/24; H04W 88/02; H04W 88/04; H04W 88/06
See application file for complete search history.

(56) References Cited

U.S. PATENT DOCUMENTS

| | | | |
|---|---|---|---|
| 9,204,250 B2 | 12/2015 | Lefkowitz | |
| 9,426,113 B2* | 8/2016 | Mahadevan | .......... H04L 67/025 |
| 9,475,422 B2 | 10/2016 | Hillis et al. | |
| 9,510,316 B2 | 11/2016 | Skaaksrud | |

(Continued)

OTHER PUBLICATIONS

Ahlgren et al., "A Survey of Information-Centric Networking", Dagstuhl Seminar Proceedings 10492, Information-Centric Networkong, pp. 1-26, Feb. 2, 2011.

(Continued)

*Primary Examiner* — Diane Mizrahi
(74) *Attorney, Agent, or Firm* — Fernando & Partners, LLP; Ying Li

(57) ABSTRACT

Techniques in an information-centric network (ICN) for facilitating the transport of passengers or items are described. In one illustrative example, a first mobile device is configured to operate as a mobile transportation-offering ICN endpoint device. The first mobile device may connect to one of a plurality of fixed-location ICN nodes in the ICN network. The first mobile device may communicate in the ICN network one or more interest packet messages indicating an interest in a passenger or item to transport. The interest in a passenger or item to transport may be indicated in, for example, a Named Data Object (NDO). The one or more interest packet messages may include current transportation route information indicating a current anticipated route of transportation for a current passenger or item. In response, the first mobile device may receive, from a second mobile device configured to operate as a mobile transportation-accepting ICN node, one or more response messages indicating an acceptance of the transport.

18 Claims, 8 Drawing Sheets

(56) References Cited

U.S. PATENT DOCUMENTS

| | | |
|---|---|---|
| 9,716,622 B2 * | 7/2017 | Mahadevan ........ H04L 61/1582 |
| 2012/0130627 A1 | 5/2012 | Islam et al. |
| 2016/0036730 A1 | 2/2016 | Kutscher et al. |
| 2016/0164792 A1 | 6/2016 | Oran |
| 2016/0212148 A1 * | 7/2016 | Uzun ................... H04L 63/123 |
| 2016/0380986 A1 | 12/2016 | Millar |
| 2017/0034085 A1 | 2/2017 | Bijor et al. |
| 2017/0034110 A1 | 2/2017 | Bijor et al. |

OTHER PUBLICATIONS

Ahlgren et al., "A Survey of Information-Centric Networking", IEEE Communications Maganize, pp. 26-36, Jul. 2012.
Gerla et al.,"Internet of Vehicles: From Intelligent Grid to Autonomous Cars and Vehicular Clouds", 2014 IEEE World Forum on Internet of Things (WF-IoT), pp. 241-246, 2014.

* cited by examiner

INFORMATION-CENTRIC NETWORKING (ICN) TECHNIQUES FOR FACILITATING THE SHARED TRANSPORT OF PASSENGERS OR ITEMS

TECHNICAL FIELD

The present disclosure relates generally to facilitating shared transport of passengers or items, and more particularly to using information-centric networking (ICN) techniques for facilitating the shared transport of passengers or items.

BACKGROUND

The transportation industry has seen many changes in recent years, but none has been more noticeable or impactful than the introduction of application-based ride services. Various applications are used to match drivers and passengers. When a passenger requests a ride, a driver in the area is notified through the application and dispatched. The use of autonomous or self-driving vehicles in such environments is also becoming a reality.

There is an ongoing need for advancing and improving devices, applications, networks, and communications for use in the transportation environment, as well as advancing and improving devices, applications, networks, and communications associated with other similar or even unrelated environments.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
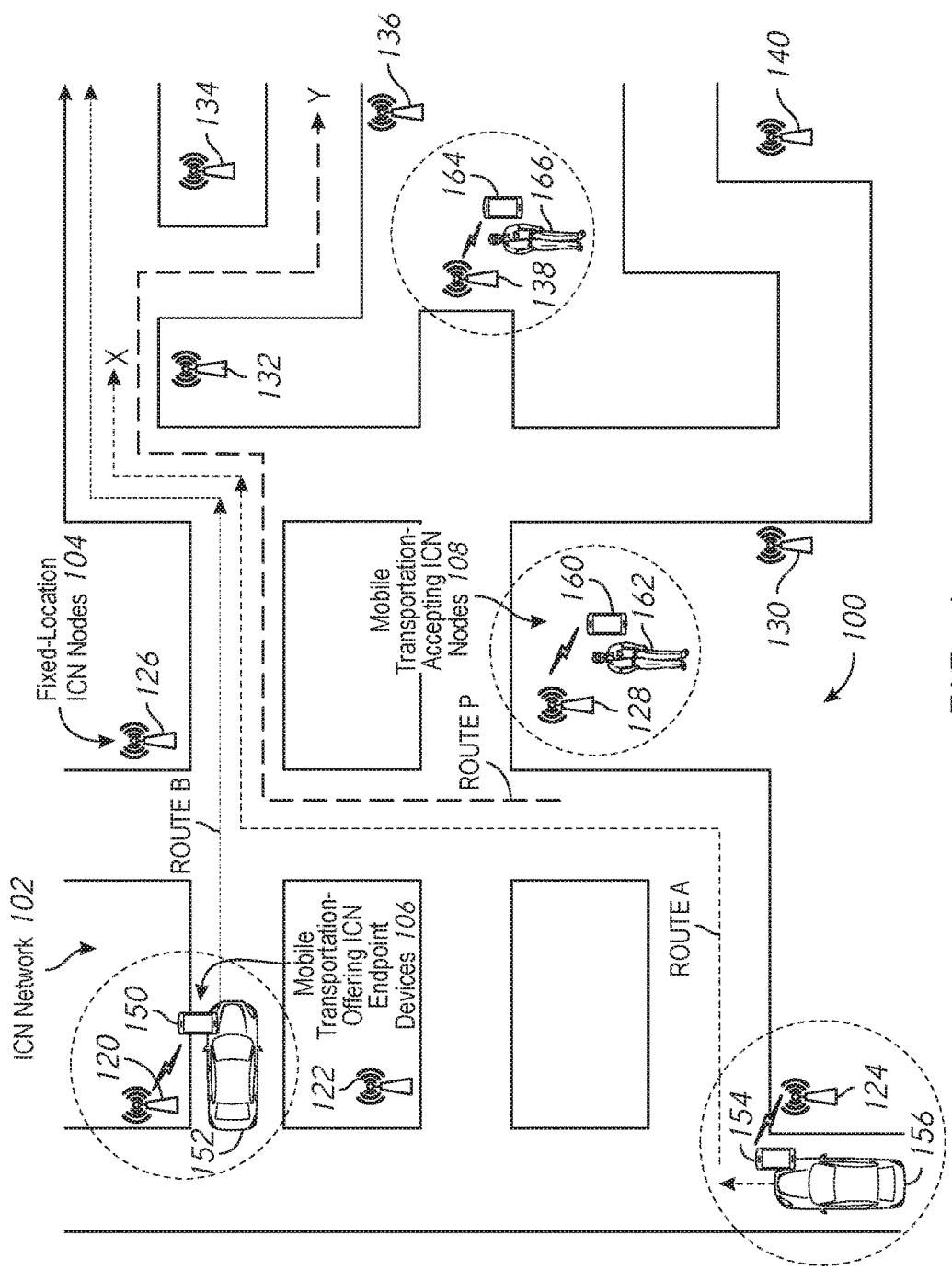
FIG. 1 is an illustrative diagram of an information-centric network (ICN) for use in facilitating the (e.g. shared) transport of passengers or items, shown in context with a map of a geographic region, where the ICN network may include a plurality of fixed-location ICN nodes (e.g. at pickup locations), a first plurality of mobile devices configured to operate as mobile transportation-offering ICN endpoint devices (e.g. for use in vehicles for transportation), and a second plurality of mobile devices configured to operate as mobile transportation-accepting ICN nodes (e.g. for use by passengers or for items to be transported)

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques in an information-centric network (ICN) for facilitating the transport of passengers or items are described herein.

In one illustrative example, a first mobile device configured to operate as a mobile transportation-offering ICN endpoint device may operate to connect to one of a plurality of fixed-location ICN nodes in a ICN network. The first mobile device may communicate in the ICN network one or more interest packet messages indicating an interest in a passenger or item to transport. The interest in the passenger or item to transport may be indicated in a Named Data Object (NDO) of an interest packet message. The one or more interest packet messages may include current transportation route information indicating a current anticipated route of transportation for a current passenger or item associated with the first mobile device. The first mobile device may receive, from a second mobile device configured to operate as a mobile transportation-accepting ICN node, one or more response messages indicating an acceptance of the transport.

In another illustrative example, a first mobile device configured to operate as a mobile transportation-accepting ICN node may operate to connect to one of a plurality of fixed-location ICN nodes in the ICN network. The first mobile device may receive, from a second mobile device configured to operate as a mobile transportation-offering endpoint device, one or more interest packet messages indicating an interest in a passenger or item to transport. The interest in the passenger or item to transport may be indicated in a Named Data Object (NDO) of an interest packet message. The one or more interest packet messages may include current transportation route information indicating a current anticipated route of transportation for a current passenger or item associated with the second mobile device. In response to a user input, the first mobile device may send, via the fixed-located ICN node, one or more response messages indicating an acceptance of the transport.

Example Embodiments

As described previously, the transportation industry has seen many changes in recent years. However, no change has been more noticeable or impactful than the introduction of application-based ride services. Various applications are used to match drivers and passengers; when a passenger requests a ride, a driver in the area is notified through the application and dispatched. There is an ongoing need for advancing and improving devices, applications, networks, and communications for use in the transportation environment, as well as advancing and improving devices, applications, networks, and communications associated with other similar or even unrelated environments.

Figure 2:
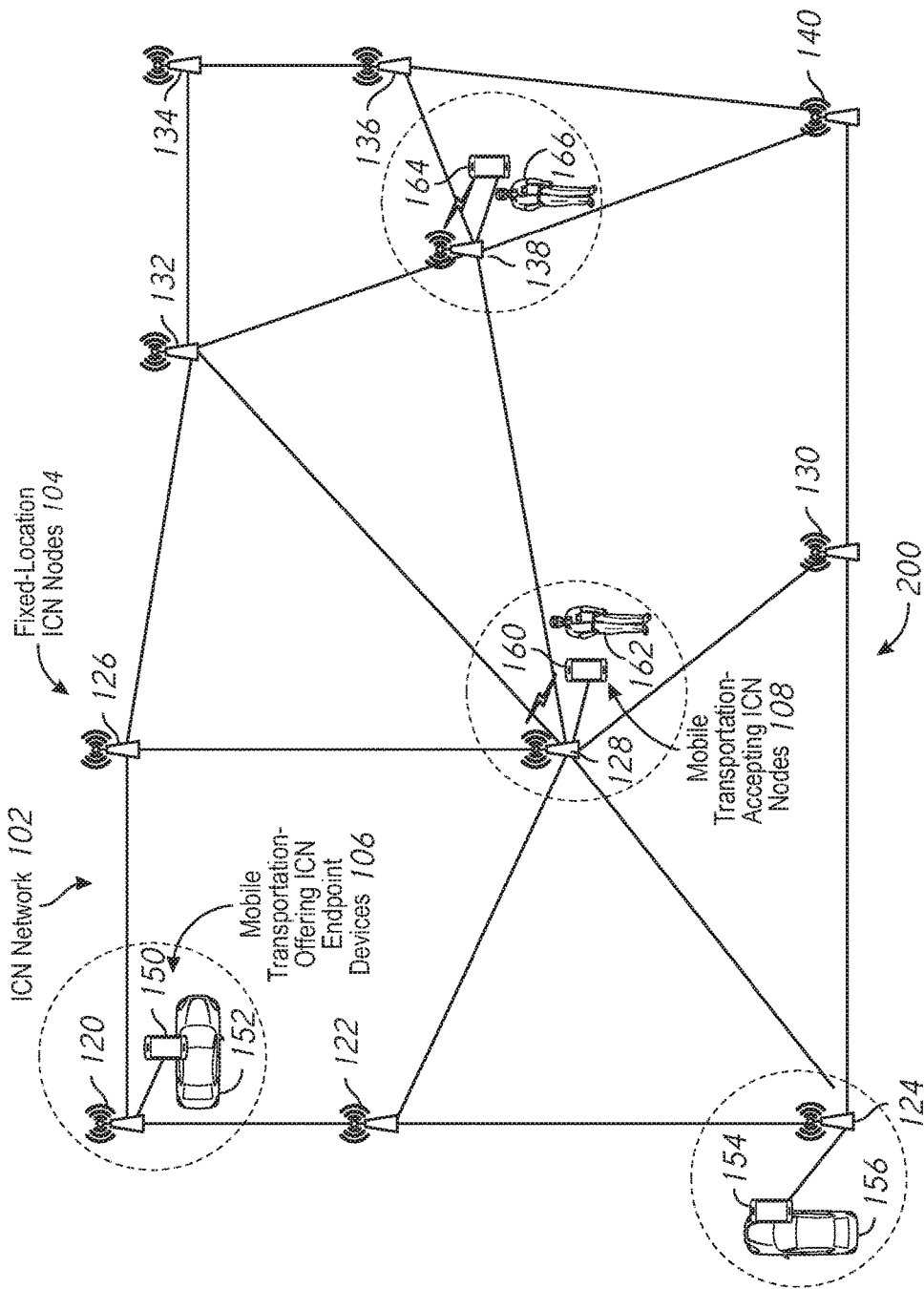
FIG. 2 is an illustrative diagram of the ICN network of FIG. 1 without the context of the map, and showing pertinent connections between the fixed-location ICN nodes, the mobile transportation-offering ICN endpoint devices, and the mobile transportation-accepting ICN nodes.

FIG. 1 is an illustrative diagram 100 of an information-centric network (ICN) 102 for use in facilitating the (e.g. shared) transport of passengers or items. The ICN network 102 of FIG. 1 is shown in context with a map of a geographic region in a top-down view. FIG. 2 is an illustrative diagram 200 of the ICN network 102 of FIG. 1 without the context of the map, showing pertinent (example) connections between network entities. Note that ICN network 102 of FIGS. 1 and 2 is merely an example configuration for describing an illustrative example of the techniques of the present disclosure.

ICN network 102 and its devices therein may utilize the architecture and/or protocols of any suitable type of information-centric networking approach, such as Data-Oriented Network Architecture (DONA), Content-Centric Networking (CCN), Publish-Subscribe Internet Routing Paradigm (PSIRP), Network of Information (NetInf) from the Design of the Future Internet (4WARD) project, other suitable ICN variation, or combinations of the above. The ICN architecture and/or protocols described herein may be provided over any suitable existing communication network architecture (s), such as the Internet, cellular, and/or or wireless local area network (WLAN) (e.g. IEEE 802.11) infrastructure.

In FIGS. 1 and 2, ICN network 102 is shown to include a plurality of fixed-location ICN nodes 104, a first plurality of mobile devices configured to operate as mobile transportation-offering ICN endpoint devices 106, and a second plurality of mobile devices configured to operate as mobile transportation-accepting ICN nodes 108. The first plurality of mobile devices may be referred to as mobile transportation-offering endpoint devices and the second plurality of mobile devices may be referred to as mobile transportation-accepting ICN nodes.

Fixed-location ICN nodes 104 may be located at or near pickup areas or stations, where transportation vehicles may pick up passengers or items for transport (and/or conversely where passengers or items may await pickup from transporting vehicles). Fixed-location ICN nodes 104 may form part of the fixed network infrastructure of ICN network 102. Fixed-location ICN nodes 104 may be connected together for network communications using wired or wireless links (FIG. 2). The interconnections between fixed-ICN nodes 104 shown in FIG. 2 is merely an example for illustrative purposes. In some implementations, fixed-location ICN nodes 104 may be connected together to form a mesh network.

The number of fixed-location nodes 104 in ICN network 102 may vary depending on the implementation. In some implementations, the number of fixed-location nodes may be quite large, spanning across an entire city, region, state, or country. In the limited geographic region shown in FIGS. 1 and 2, fixed-location ICN nodes 104 include eleven (11) fixed-location ICN nodes, namely, fixed-location ICN nodes 120, 122, 124, 126, 128, 130, 132, 134, 136, 138, and 140. Each one of fixed-location ICN nodes 104 may have a location associated therewith, such as a geographic location or geolocation, Each one of fixed-location ICN nodes 104 may include one or more processors, a memory cache, and a wireless transceiver. The wireless transceiver of each fixed-location ICN node is configured to connect and communicate with mobile devices which operate as mobile transportation-offering ICN endpoint devices and mobile transportation-accepting ICN nodes. Each one of fixed-location ICN nodes 104 is configured to serve, connect and communicate with a plurality of such mobile devices simultaneously.

In some implementations, the wireless transceiver of each fixed-location ICN node is configured to operate in accordance with wireless local area network (WLAN) (e.g. IEEE 802.11) protocols (e.g. as a wireless access point), where each device may further include a cellular transceiver interface and a global positioning system (GPS) module for location services.

Some mobile devices (e.g. mobile phones, smart phones, computer tablets, etc.) in ICN network 102 may be configured to operate as mobile transportation-offering ICN endpoint devices 106. Mobile transportation-offering ICN endpoint devices 104 may be for use (e.g. carried and/or connected) in vehicles for the transportation of passengers or items. A transportation vehicle may be any suitable type of vehicle, such as an automobile, a van, a taxi, a trolley, a truck, a bicycle, or the like. In some implementations, some or all mobile transportation-offering ICN endpoint devices 106 are connected in transportation vehicles which are autonomous or self-driving vehicles, so as to provide a geographic region with autonomous, ride-sharing transportation services.

Each one of mobile transportation-offering ICN endpoint devices 106 may include one or more processors, a memory cache, and a wireless transceiver. Each one of mobile transportation-offering ICN endpoint devices 106 may also include a user interface, which may include a visual display (e.g. a touch screen display) and/or one or more keys or a keypad.

The wireless transceiver of each mobile transportation-offering ICN endpoint device 106 is configured to connect and communicate with any (nearby or in-range) one of fixed-location ICN nodes 104 in ICN network 104. For example, mobile transportation-offering ICN endpoint device 150 associated with a transportation vehicle 152 is shown as connected with fixed-location ICN node 120, whereas mobile transportation-offering ICN endpoint device 154 associated with a transportation vehicle 156 is shown as connected with fixed-location ICN node 124. Note that a number of different mobile transportation-offering ICN endpoint devices 106 may be simultaneously served by, connect, and communicate with a single fixed-location ICN node. Note further that a mobile transportation-offering ICN endpoint device may be simultaneously connected to two or more fixed-location ICN nodes 104.

In some implementations, the wireless transceiver of each mobile transportation-offering ICN endpoint device 106 is configured to operate in accordance with WLAN (e.g. IEEE 802.11) protocols (e.g. as a wireless end station or STA), where each device may further include a cellular transceiver interface for communications with a cellular telecommunication network infrastructure. Being mobile or portable, each one of mobile transportation-offering ICN endpoint devices 106 may have a (dynamically-changing) location associated therewith, such as a geographic location or geolocation (e.g. with use of a GPS module).

In some implementations, some or all mobile transportation-offering ICN endpoint devices 106 are mobile phones, smart phones, computer tablets, or the like, having applications configured to perform mobile transportation-offering ICN techniques of the present disclosure. In general, mobile transportation-offering ICN endpoint devices 106 may operate as endpoint devices in ICN network 102. For basic operation, each one of mobile transportation-offering ICN endpoint devices 106 is configured to connect to at least one of the fixed-location ICN nodes 104 in the ICN network 102, send in ICN network 102 one or more interest packet messages indicating an interest in a passenger or item to transport, and to receive via the ICN network 102 from one or more mobile transportation-accepting ICN nodes 108 one or more response messages indicating an acceptance of the transport.

Other mobile devices (e.g. mobile phones, smart phones, computer tablets, etc.) in ICN network 102 may be configured to operate as mobile transportation-accepting ICN nodes 108. Mobile transportation-accepting ICN nodes 108 may be for use (e.g. carried) by passengers or for items to be transported.

Each one of mobile transportation-accepting ICN nodes 108 may include one or more processors, a memory cache, and a wireless transceiver. Each one of mobile transportation-accepting ICN nodes 108 may also include a user interface, which may include a visual display (e.g. a touch screen display) and/or one or more keys or a keypad.

The wireless transceiver of each mobile transportation-accepting ICN node 108 is configured to connect and communicate with any (nearby or in-range) one of fixed-location ICN nodes 104 in ICN network 104. For example, mobile transportation-accepting ICN node 160 associated with a passenger 162 is shown as connected with fixed-location ICN node 128, and mobile transportation-accepting ICN node 164 associated with a passenger 166 is shown as connected with fixed-location ICN node 138. Note that a number of different mobile transportation-accepting ICN nodes 108 may be simultaneously served by, connect, and communicate with a single fixed-location ICN node. Note further that a mobile transportation-accepting ICN nodes may be simultaneously connected to two or more fixed-location ICN nodes 104.

In some implementations, the wireless transceiver of each mobile transportation-accepting ICN node is configured to operate in accordance with WLAN (e.g. IEEE 802.11) protocols (e.g. as a wireless end station or STA), where each node may further include a cellular transceiver interface for communications with the cellular telecommunication network infrastructure. Being mobile or portable, each one of mobile transportation-accepting ICN nodes may have a (dynamically-changing) location associated therewith, such as a geographic location or geolocation (e.g. with use of a GPS module).

In some implementations, some or all mobile transportation-accepting ICN nodes 108 are mobile phones, smart phones, computer tablets, or the like, having applications configured to perform mobile transportation-accepting ICN techniques of the present disclosure. In basic operation, each one of mobile transportation-accepting ICN nodes 108 is configured to connect to at least one of the fixed-location ICN nodes 104 in the ICN network 102, receive via ICN network 102 from one or more mobile transportation-offering ICN endpoint devices 106 one or more interest packet messages indicating an interest in a passenger or item to transport, and to send in ICN network 102 one or more response messages indicating an acceptance of the transport.

As is apparent, in ICN network 102, fixed-location ICN nodes 104 are configured to route interest packet messages between each other, as well as to mobile transportation-accepting ICN nodes 108 connected as ICN leaf nodes. Mobile transportation-accepting ICN nodes 108 connected as ICN leaf nodes will not route interest packet messages. Mobile transportation-offering ICN endpoint devices 106 and mobile transportation-accepting ICN nodes 108 are indeed mobile, and thus may regularly enter and exit the fixed ICN infrastructure (i.e. the fixed-location ICN nodes 104).

As described earlier above, mobile transportation-offering ICN endpoint device 154 associated with transportation vehicle 156 is connected with fixed-location ICN node 124. Current transportation route information of mobile transportation-offering ICN endpoint device 154 defines a current anticipated route of transportation for transportation vehicle 156. The current anticipated route of transportation may be for a current passenger or item in transportation vehicle 156. The current transportation route information for transportation vehicle 156 may be associated with, defined, and/or indicated at least in part by one or more fixed-location ICN nodes along its current anticipated route of transportation. As shown in FIG. 1, the current anticipated route of transportation for transportation vehicle 156 having mobile transportation-offering ICN endpoint device 154 is indicated in FIG. 1 as "ROUTE A." The current anticipated route of transportation for transportation vehicle 156 (i.e. ROUTE A) is associated with, defined and indicated at least in part by ICN nodes 124, 128, and 132 and/or pickup area indicators associated with such ICN nodes.

Also as described earlier, mobile transportation-offering ICN endpoint device 150 associated with transportation vehicle 152 is connected with fixed-location ICN node 120. Current transportation route information of mobile transportation-offering ICN endpoint device 150 defines a current anticipated route of transportation for transportation vehicle 152. The current anticipated route of transportation may be for a current passenger or item in transportation vehicle 152. The current transportation route information for transportation vehicle 152 may be associated with, defined, and/or indicated at least in part by one or more fixed-location ICN nodes along its current anticipated route of transportation.

As shown in FIG. 1, the current anticipated route of transportation for transportation vehicle 152 is indicated in FIG. 1 as "ROUTE B." The current anticipated route of transportation for transportation vehicle 152 (i.e. ROUTE B) is associated with, defined and indicated at least in part by ICN nodes 120, 126, 132, and 134 and/or pickup area indicators associated with such ICN nodes.

Further as described earlier, mobile transportation-accepting ICN node 160 associated with passenger 162 is connected with fixed-location ICN node 128. Desired transportation route information of mobile transportation-accepting ICN node 160 defines a desired route of transportation for passenger 162. The desired transportation route information for passenger 162 may be associated with, defined, and/or indicated at least in part by one or more fixed-location ICN nodes along its desired route of transportation. As shown in FIG. 1, the desired route of transportation for passenger 162 is indicated in FIG. 1 as "ROUTE P." The desired route of transportation for passenger 162 (i.e. ROUTE P) is associated with, defined and indicated at least in part by ICN nodes 128, 132, and 136 and/or pickup areas associated with such ICN nodes. Similar to mobile transportation-accepting ICN node 162 associated with passenger 162, mobile transportation-accepting ICN node 164 associated with passenger 166 may have its own desired transportation route information which defines a desired route of transportation for passenger 166.

Figure 3:
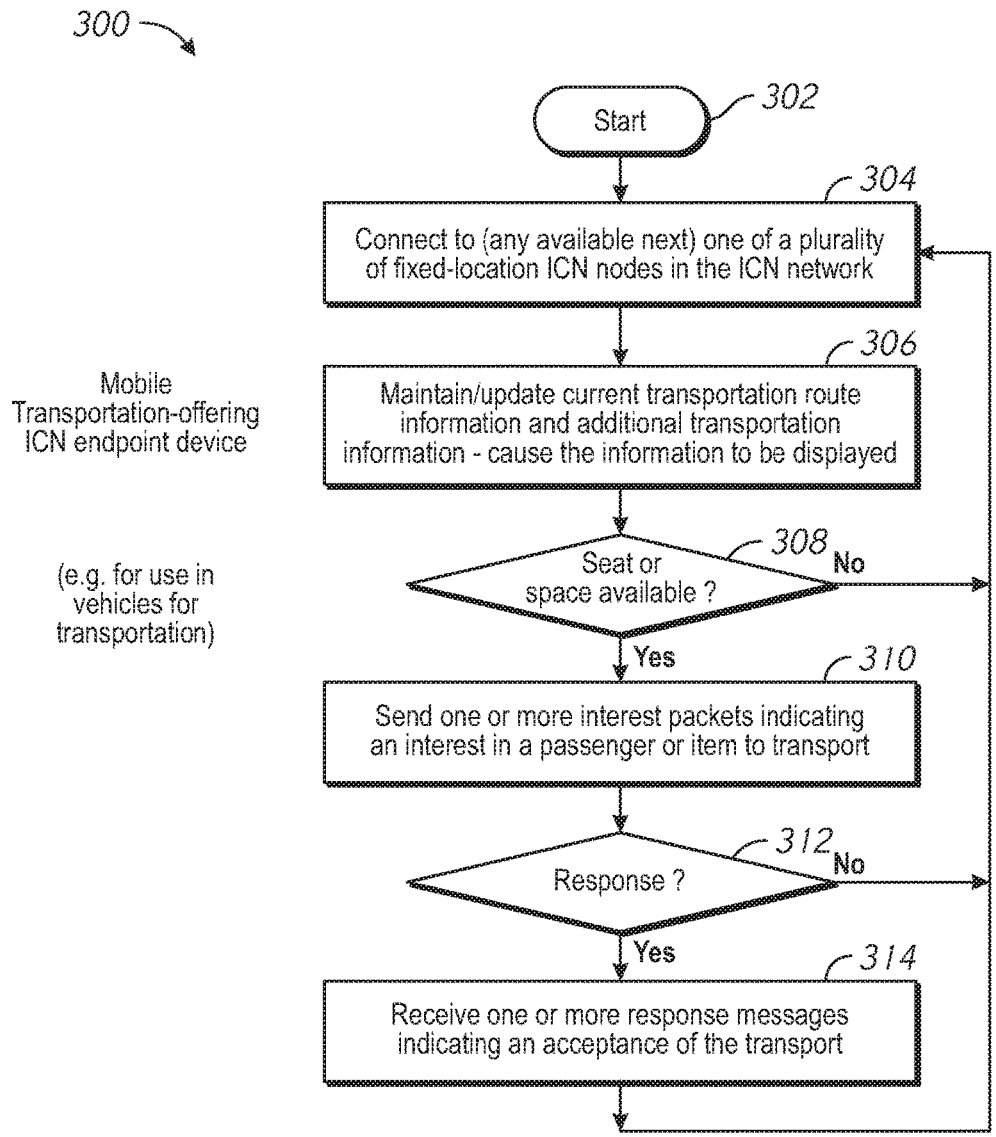
FIG. 3 is a flowchart for describing a method for use in facilitating the (e.g. shared) transport of passengers or items with use of an ICN network, which may be employed by one or more of the mobile transportation-offering ICN endpoint devices (e.g. for use in vehicles for transportation)

FIG. 3 is a flowchart 300 for describing a method for use in facilitating the (e.g. shared) transport of passengers or items with use of an ICN network (e.g. ICN network 102 shown and described in relation to FIGS. 1-2). The method of FIG. 3 may be performed by one or more mobile transportation-offering ICN endpoint devices (e.g. for use in vehicles for transportation). The method of FIG. 3 may be performed cooperatively with the method of FIG. 4, which may be performed by one or more mobile transportation-accepting ICN nodes (described later below).

Note that use of the method of FIG. 3 may result in an increase in the efficiency of data communications associated with applications that provide for shared transportation services (as well as various other/side benefits, which may include an increase in the sharing of transportation vehicles, an increase in the efficiency of transportation services, an increase in the communication of the availability of shared transportation services, and/or a reduction in the cost of transportation services).

In the method of FIG. 3, a mobile device is enabled to operate as a mobile transportation-offering ICN endpoint device for offering (e.g. shared) transportation to passengers or items having mobile transportation-accepting ICN nodes. The mobile transportation-offering ICN endpoint device may be carried and/or connected in a transportation vehicle.

Beginning at a start block 302 of FIG. 3, the mobile transportation-offering ICN endpoint device may connect to one of a plurality of fixed-location ICN nodes in the ICN network for communications (step 304 of FIG. 3). During operation, the mobile transportation-offering ICN endpoint device may maintain or maintain access to current transportation route information (step 306 of FIG. 3). This is especially the case where the mobile transportation-offering ICN endpoint device is seeking a passenger or good to transport, and sending an interest packet associated with the same.

The current transportation route information may define a current anticipated route of transportation of the transportation vehicle. The current anticipated route of transportation may be a desired route for a current passenger or item being transported by the transportation vehicle. The current transportation route information for the transportation vehicle may be associated with, defined, and/or indicated at least in part by one or more fixed-location ICN nodes of along its current anticipated route of transportation and/or pickup areas associated therewith.

The mobile transportation-offering ICN endpoint device may cause the current transportation route information to be presented in a visual display of the device (again, step 306 of FIG. 3). Here, the current anticipated route of transportation, the one or more fixed-location ICN nodes along the current anticipated route of transportation, and/or the pickup areas associated with these fixed-location ICN nodes may be presented in the visual display.

Figure 5:
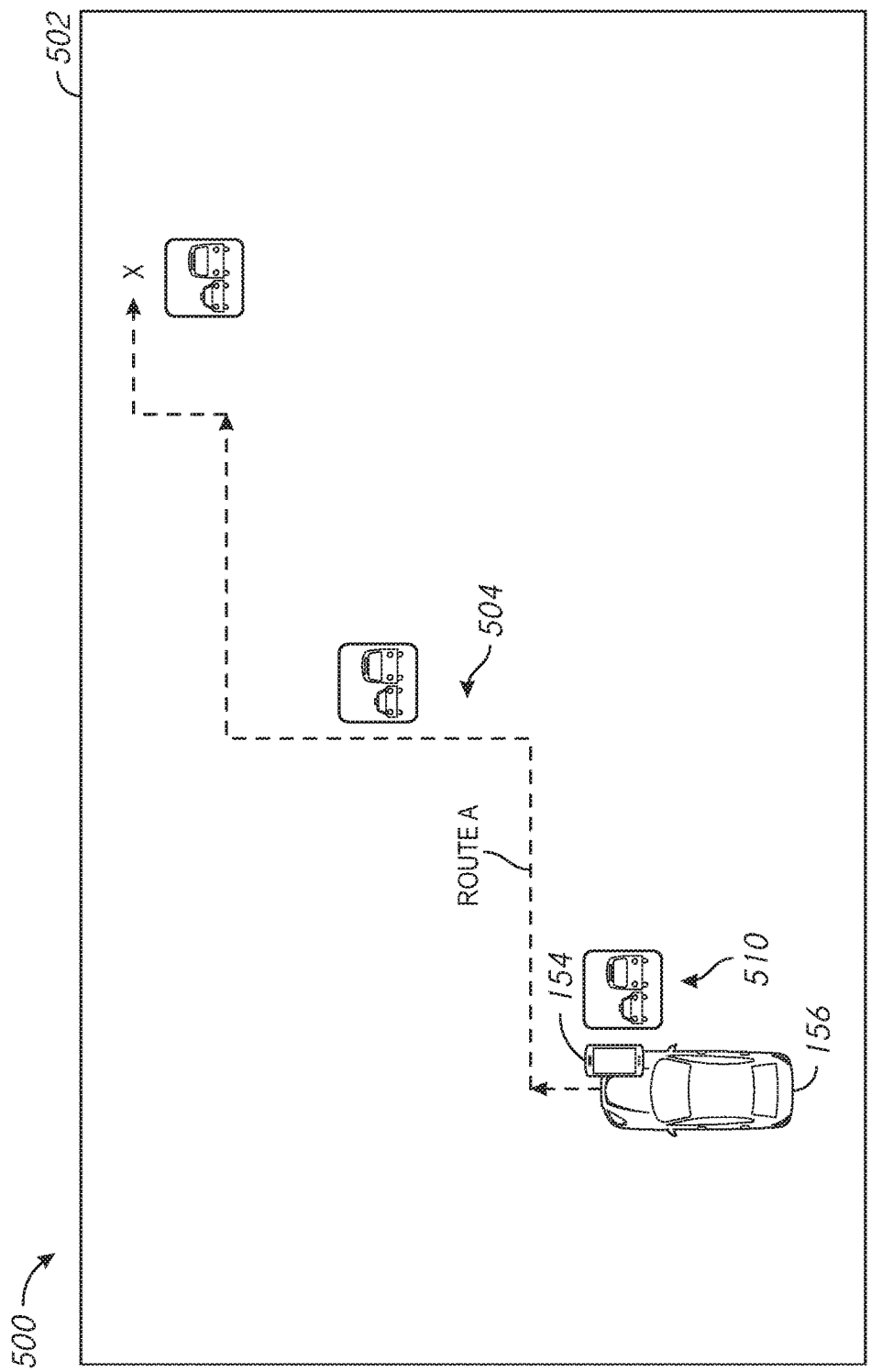
FIG. 5 is an illustration of a first presentation in a first visual display of a first mobile communication device configured to operate as a first mobile transportation-offering ICN endpoint device, where the first presentation corresponds to first current transportation route information indicating a current anticipated route of transportation for a current passenger or item associated with the first mobile transportation-offering ICN endpoint device.
Figure 6:
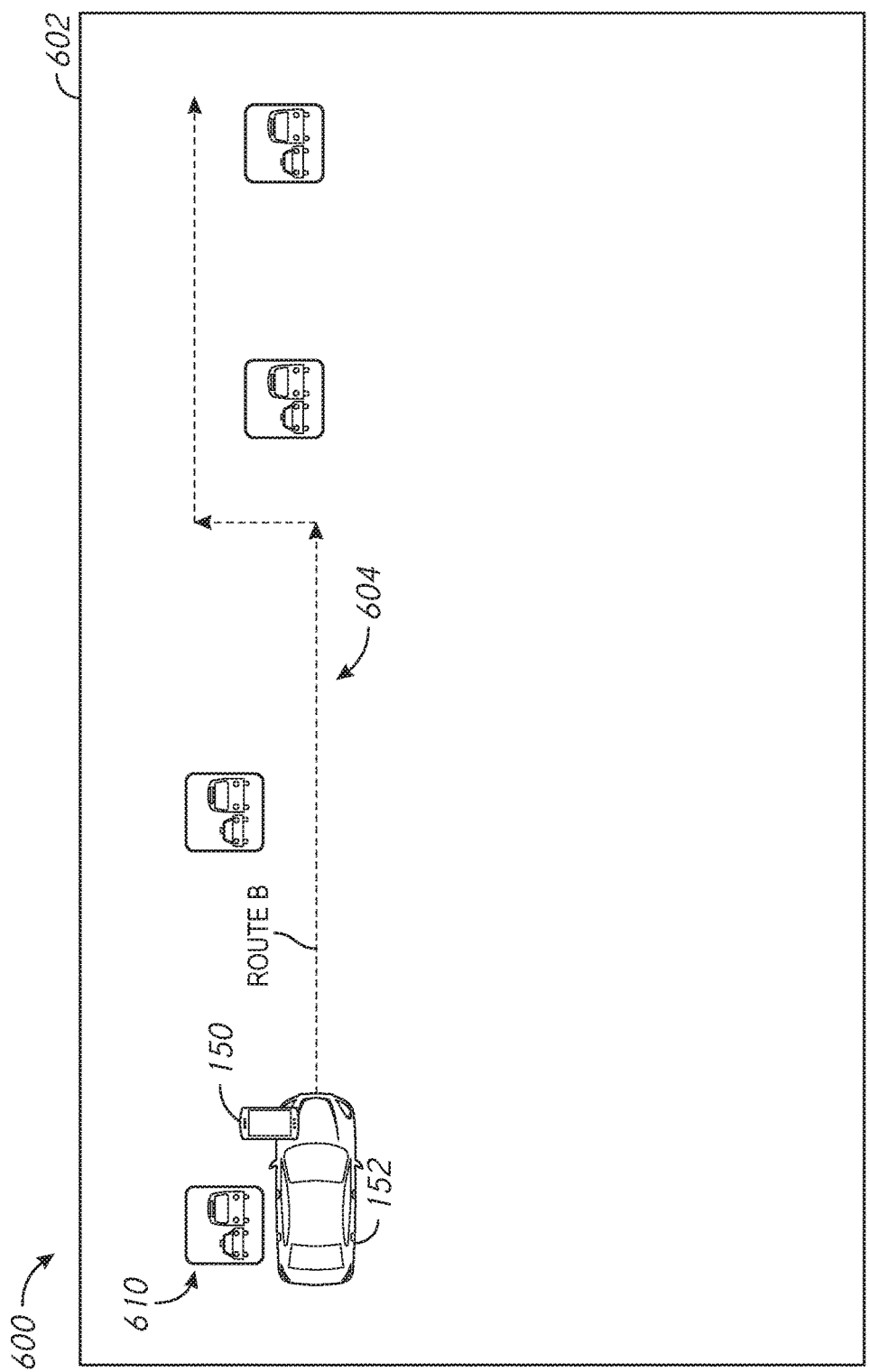
FIG. 6 is an illustration of a second presentation in a second visual display of a second mobile communication device configured to operate as a second mobile transportation-offering ICN endpoint device, where the second presentation corresponds to second current transportation route information indicating a current anticipated route of transportation for a current passenger or item associated with the second mobile transportation-offering ICN endpoint device.

For illustrating step 306 of FIG. 3, FIG. 5 is provided with a presentation 500 in a visual display 502 of a device. Presentation 500 of FIG. 5 includes current transportation route information 504. In the example of FIG. 5, the mobile transportation-offering ICN endpoint device is mobile transportation-offering ICN endpoint device 156 of FIG. 1, where the current transportation route information 504 is indicated as ROUTE A as previously described in relation to FIG. 1. A plurality of pickup area indicators 510 corresponding to ICN nodes 124, 128, and 132 (see FIG. 1) along ROUTE A are presented in visual display 502 together with the route. To further illustrate step 306 of FIG. 3, FIG. 6 provides an illustration of a presentation 600 in a visual display 602 of another mobile transportation-offering ICN endpoint device. Presentation 600 of FIG. 6 may include current transportation route information 604. In the example of FIG. 6, the mobile transportation-offering ICN endpoint device is mobile transportation-offering ICN endpoint device 152 of FIG. 1, where current transportation route information 604 indicates ROUTE B as previously described in relation to FIG. 1. A plurality of pickup area indicators 610 corresponding to ICN nodes 120, 126, 132, and 134 (see FIG. 1) along ROUTE B are presented in visual display 602 together with the route.

Note further that the mobile transportation-offering ICN endpoint device may generate, maintain, and/or or maintain access to additional transportation information. Again, this is especially the case where the mobile transportation-offering ICN endpoint device is seeking a passenger or good to transport, and sending an interest packet associated with the same.

The additional transportation information may be or include user profile information, current location or geolocation information, estimated time of arrival information, and/or estimated transportation cost information. The user profile information includes information of user profile associated with a user of the device (e.g. the driver of the transportation vehicle). The user profile information may be or include information identifying the user, a user name, a user age, a user photo, one or more ratings or reviews of the user, and a vehicle description, as examples. The current location information may indicate a current location or geolocation of the transportation vehicle (e.g. with use of a GPS module). The estimated time of arrival information may indicate an estimated time of arrival information of the transportation vehicle to a specified location (e.g. a fixed-location ICN node, a pickup area, or other). The estimated cost information may indicate an estimated cost for the transportation to one or more specified locations. The estimated cost may be calculated based on the route length and/or travel time, with cost reductions made per every additional passenger or item sharing the transportation vehicle (e.g. cost reductions made based on seat occupancy).

The additional transportation information may additionally or alternatively be or include seat or space availability information and/or seat or space occupancy information. The seat or space availability information may indicate any availability of seats or spaces in the transportation vehicle. The seat or space availability information may be availability data (e.g. a number of seats/spaces available) or an availability indication (e.g. 0=no seats/spaces available, 1=seats/spaces available). The seat or space occupancy information may indicate any occupancy of seats or spaces in the transportation vehicle. The seat or space occupancy information may be occupancy data (e.g. a number of seats/spaces occupied) or an occupancy indication (e.g. 0=no seats/spaces occupied, 1=seats/spaces occupied). Current seat or space availability data or indication may be regularly maintained and updated in response to passengers or items entering and exiting the transportation vehicle. For example, the seat or space availability data or indication may be regularly maintained and updated via the user interface, one or more sensors in the transportation vehicle, or other detection mechanism of the mobile transportation-offering ICN endpoint device.

Note that some or all of the additional transportation information may be stored and/or maintained at a server in the ICN network, stored in association with a user ID (uid) of the mobile transportation-offering ICN endpoint device. The information may be made accessible to other devices connected in the ICN network. For example, a device may receive this information by sending an interest packet requesting information (e.g. requesting status information, uid_status_information).

Referring back to FIG. 3, the mobile transportation-offering ICN endpoint device may identify whether availability exists for a seat or a space for transportation in the transportation vehicle (step 308 of FIG. 3). The mobile transportation-offering ICN endpoint device may perform step 308 by reading and examining the seat or space availability information (e.g. data < > 0 ?; or indication =1 ?).

When availability exists for a seat or a space for transportation, the mobile transportation-offering ICN endpoint device may send or communicate, in the ICN network via the fixed-location ICN node, one or more interest packet messages indicating an interest in a passenger or item to transport (step 310 of FIG. 3). The interest in a passenger or item to transport may be indicated in a Named Data Object (NDO) of an interest packet message.

The one or more interest packet messages communicated in step 310 may include the current transportation route information. Again, the current transportation route information may indicate a current anticipated route of transportation of the transportation vehicle. The current anticipated route of transportation may be a desired route for a current passenger or item. The one or more interest packet messages communicated in step 310 may additionally include any of the additional transportation information described above, such as any of the user profile information, the current location information, the estimated time of arrival information, the seat or space availability information, the seat or space occupancy information, and/or the estimated transportation cost information.

When no seat or a space is available for transportation, the mobile transportation-offering ICN endpoint device may refrain from sending or communicating the one or more interest packet messages, where the method may proceed back to step 304 of flowchart 300. In some implementations, however, the mobile transportation-offering ICN endpoint device may still send or communicate the one or more interest packet messages when no seat or space is available (e.g. providing the route information but indicating no seat or space availability).

The mobile transportation-offering ICN endpoint device may identify whether any responses associated with the communicated interest in the passenger or item are received (step 312 of FIG. 3). When a response exists ("Yes" at step 312), the mobile transportation-offering ICN endpoint device may receive, from a mobile transportation-accepting ICN node, one or more response messages indicating an acceptance of the transport (step 314 of FIG. 3). In response to receiving the one or more response messages, the mobile transportation-offering ICN endpoint device may set an indication for the acceptance or booking of the seat or space in the transportation vehicle, for at least (e.g. a specified) part of the current anticipated route.

The one or more response messages received in step 314 of FIG. 3 may include passenger or item information associated with the passenger or item to be transported. The passenger or item information may identify or indicate the passenger or item. In some implementations, passenger information may be or include user profile information of a user profile of a user of the mobile transportation-accepting ICN node (i.e. the passenger to be transported). The user profile information may be or include a user name, a user age, a user photo, as examples. The passenger or item information may additionally include current location information of the passenger or item. The current location information may be or include a current location or geolocation of the passenger or item (e.g. with use of a GPS module).

The passenger or item information may also include passenger or item requirement information associated with the passenger or item. The passenger or item requirement information may indicate the needs of the passenger or item to be transported. The passenger or item requirement information may be or include seat or space requirement information. The seat or space requirement information may indicate the seat or space requirement of the passenger(s) or item(s) to be transported. The seat or space requirement information may be or include a number of seats/spaces needed for the passenger(s) or item(s).

After step 314, the method may proceed back to step 304 of flowchart 300, where the device may repeat the specified actions (e.g. connect to any available next fixed-location ICN node at step 304, update the current transportation route information and/or any of the additional transportation information at step 306, etc.).

Figure 4:
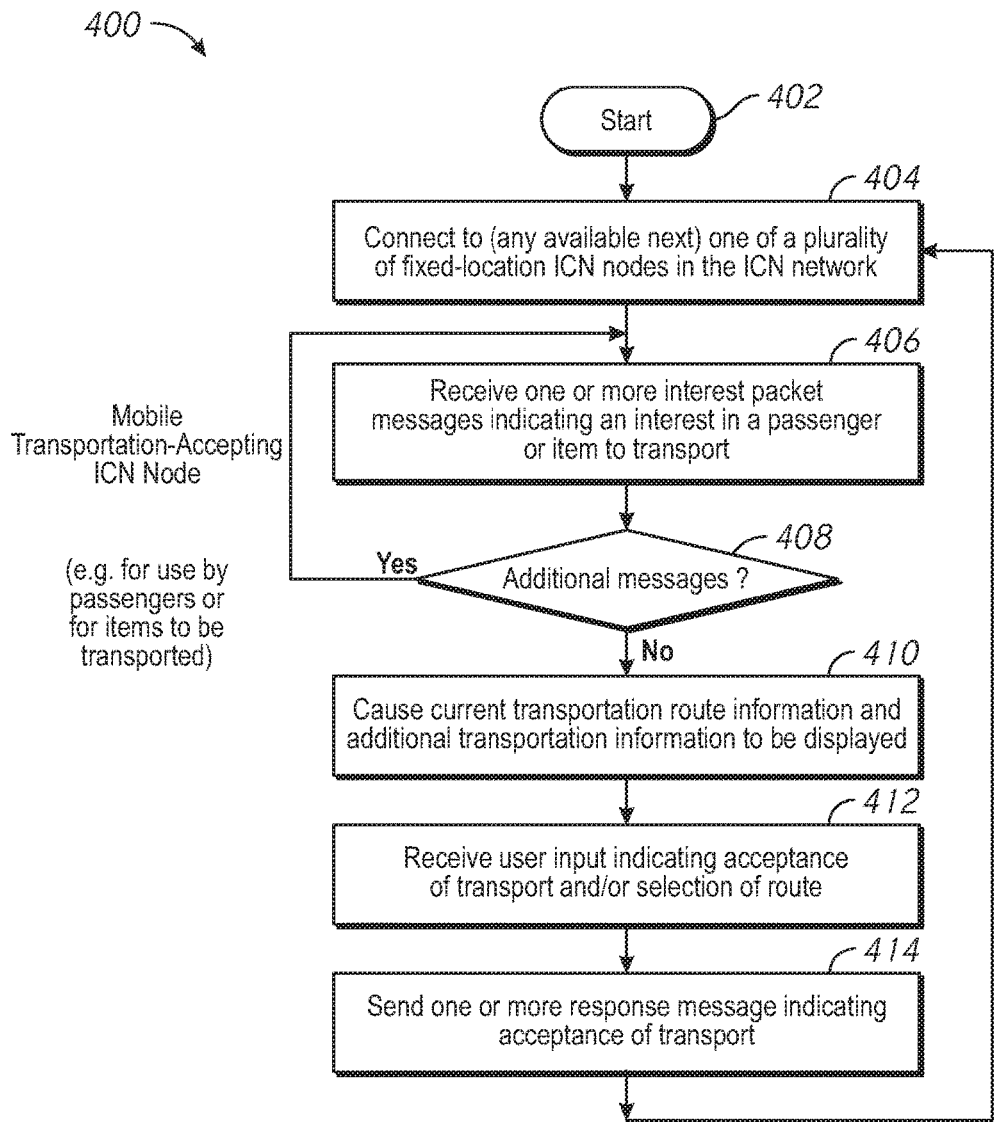
FIG. 4 is a flowchart for describing a method for use in facilitating the (e.g. shared) transport of passengers or items with use of an ICN network, which may be employed by one or more mobile transportation-accepting ICN nodes (e.g. for use by passengers or for items to be transported)

FIG. 4 is a flowchart for describing a method for use in facilitating the (e.g. shared) transport of passengers or items with use of an ICN network (e.g. ICN network 102 shown and described in relation to FIGS. 1-2). The method may be performed by one or more mobile transportation-accepting ICN nodes (e.g. for use by passengers or for items to be transported). The method of FIG. 4 may be performed cooperatively with the method of FIG. 3 which is performed by one or more mobile transportation-offering ICN endpoint devices, as described earlier above.

Note that use of the method of FIG. 4 may result in an increase in the efficiency of data communications associated with applications that provide for shared transportation services (as well as various other/side benefits, which may include an increase in the sharing of transportation vehicles, an increase in the efficiency of transportation services, an increase in the communication of the availability of shared transportation services, and/or a reduction in the cost of transportation services).

In the method of FIG. 4, a mobile device is enabled to operate as a mobile transportation-accepting ICN node for accepting offers for (e.g. shared) transportation from one or more mobile transportation-accepting ICN endpoint devices in transportation vehicles. The mobile transportation-accepting ICN node is carried with a passenger or with a user associated with an item to be transported.

Beginning at a start block 402 of FIG. 4, the mobile transportation-accepting ICN node may connect to one of a plurality of fixed-location ICN nodes in the ICN network for communications (step 404 of FIG. 4). In some implementations, the mobile transportation-accepting ICN node may connect to the fixed-location ICN node as an ICN leaf node in the ICN network. Note that the mobile transportation-accepting ICN node may connected to more than one fixed-location ICN node, for example, if the fixed-location ICN nodes are at comparable distances from the mobile transportation-accepting ICN node.

The mobile transportation-accepting ICN node may receive, from a mobile transportation-offering ICN endpoint device connected to one of the fixed-location ICN nodes, one or more interest packet messages indicating an interest in a passenger or item to transport (step 406 of FIG. 4).

When there are additional messages (step 408 of FIG. 4), the mobile transportation-accepting ICN node may receive, from another mobile transportation-offering endpoint device connected to one of the fixed-location ICN nodes, one or more additional interest packet messages indicating an interest in a passenger or item to transport (again step 406 of FIG. 4). Other additional interest packet messages may be received from other mobile transportation-offering ICN endpoint devices.

The one or more interest packet messages from a mobile transportation-offering ICN node may include current transportation route information of the associated transportation vehicle. The current transportation route information may define a current anticipated route of transportation of the transportation vehicle. The current anticipated route of transportation may be a desired route for a current passenger or item being transported by the transportation vehicle. The current transportation route information for the transportation vehicle may be associated with, defined, and/or indicated at least in part by one or more fixed-location ICN nodes of along its current anticipated route of transportation and/or pickup area associated therewith.

The one or more interest packet messages may also include additional transportation information. The additional transportation information may be or include user profile information, current location or geolocation information, estimated time of arrival information, and estimated transportation cost information. The user profile information includes information of user profile associated with a user of the device (e.g. the driver of the transportation vehicle). The user profile information may be or include information identifying the user, a user name, a user age, a user photo, one or more ratings or reviews of the user, and a vehicle description, as examples. The current location information may indicate a current location or geolocation of the transportation vehicle (e.g. with use of a GPS module). The estimated time of arrival information may indicate an estimated time of arrival information of the transportation vehicle to a specified location (e.g. a fixed-location ICN node, a pickup area, or other). The estimated transportation cost information may indicate an estimate cost for (e.g. shared) transportation to one or more specified locations. The estimated cost may be calculated based on the route length and/or travel time, with cost reductions made per every additional passenger or item sharing the transportation vehicle (e.g. cost reductions made based on seat occupancy).

The additional transportation information may additionally or alternatively be or include seat or space availability information and/or seat or space occupancy information. The seat or space availability information may indicate any availability of seats or spaces in the transportation vehicle. The seat or space availability information may be availability data (e.g. a number of seats/spaces available) or an availability indication (e.g. 0=no seats/spaces available, 1=seats/spaces available). The seat or space occupancy information may indicate any occupancy of seats or spaces in the transportation vehicle. The seat or space occupancy information may be occupancy data (e.g. a number of seats/spaces occupied) or an occupancy indication (e.g. 0=no seats/spaces occupied, 1=seats/spaces occupied). Current seat or space availability data or indication may be regularly maintained and updated in response to passengers or items entering and exiting the transportation vehicle. For example, the seat or space availability data or indication may be regularly maintained and updated via the user interface, one or more sensors in the transportation vehicle, or other detection mechanism of the mobile transportation-offering ICN endpoint device.

The mobile transportation-accepting ICN endpoint device may cause the received current transportation route information to be presented in a visual display of the device (step 410 of FIG. 4). Here, the current anticipated route of transportation, the one or more fixed-location ICN nodes along the current anticipated route of transportation, and/or the pickup area indicators associated with these fixed-location ICN nodes may be presented in the visual display. The mobile transportation-accepting ICN endpoint device may also cause the received additional transportation information to be presented in the visual display of the device (also step 410 of FIG. 4).

Figure 7:
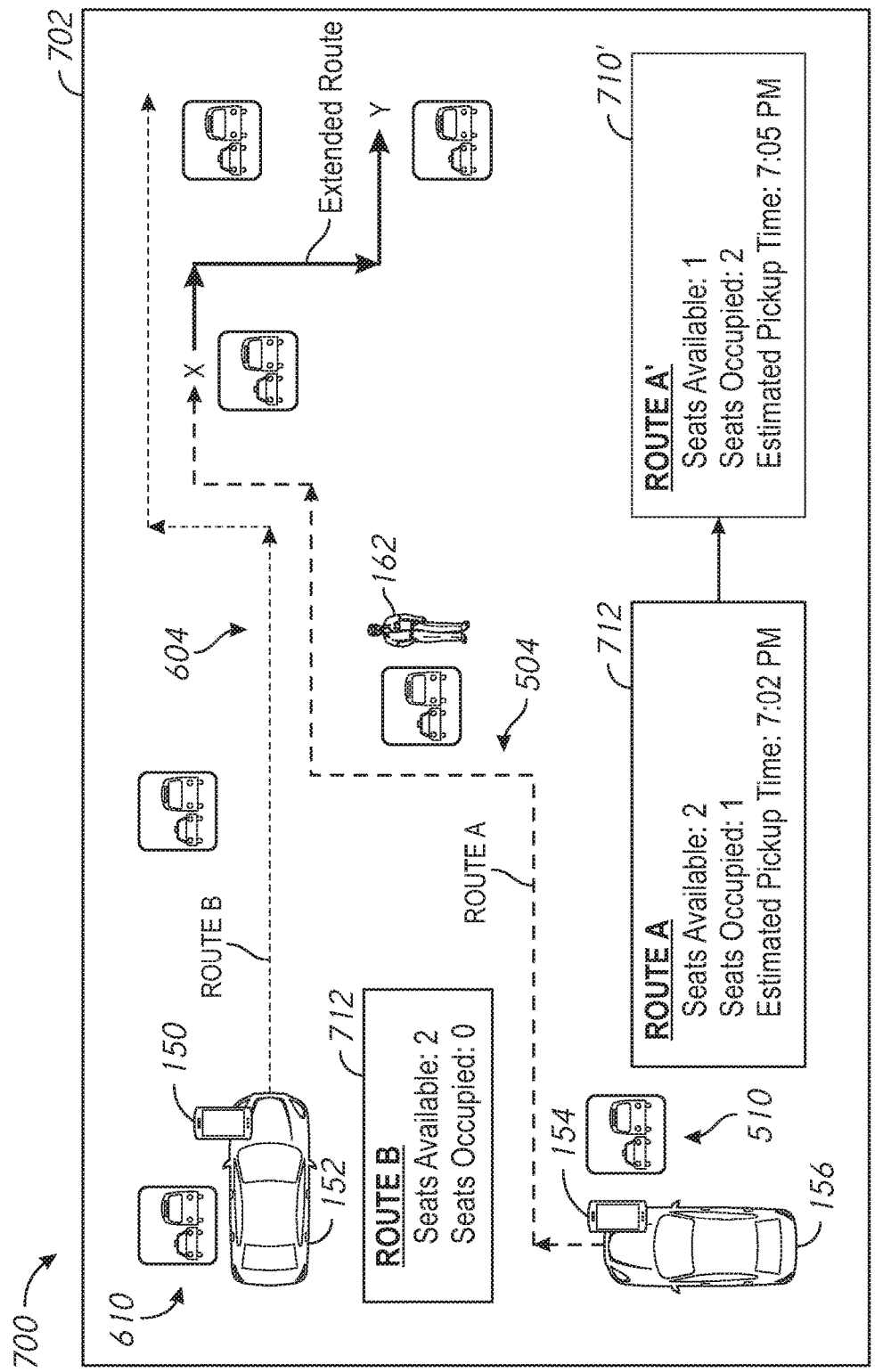
FIG. 7 is an illustration of a third presentation in a third visual display of a third mobile communication device configured to operate as a third mobile transportation-accepting ICN node, where the third presentation corresponds to the first current transportation route information associated with the first mobile transportation-offering ICN endpoint device and the second current transportation route information associated with the second mobile transportation-offering ICN endpoint device.

For illustrating step 410 of FIG. 4, FIG. 7 shows a presentation 700 in a visual display 702 of a mobile transportation-accepting ICN node. Presentation 700 of FIG. 7 includes current transportation route information for two (2) different transportation vehicles 152 and 156. More specifically, the current transportation route information includes current transportation route information 504 indicated as ROUTE A (see also e.g. FIGS. 1 and 5), and current transportation route information 604 indicated as ROUTE B (see also e.g. FIGS. 1 and 6). Pickup area indicators 510 corresponding to ICN nodes 124, 128, and 132 (see e.g. FIGS. 1 and 5) along ROUTE A are presented in visual display 702 together with the route, and pickup area indicators 610 corresponding to ICN nodes 120, 126, 132, and 134 (see e.g. FIGS. 1 and 6) along ROUTE B are presented in visual display 702 together with the route.

Presentation 700 of FIG. 7 also provides additional transportation information in visual display 702. The additional transportation information includes additional transportation information 710 associated with current transportation route information 504 ("ROUTE A)," and additional transportation information 712 associated with current transportation route information 604 ("ROUTE B"). In the example of FIG. 7, the additional transportation information 710 indicates the number of seats available ("Seats Available: 2"), the number of seats occupied ("Seats Occupied: 1"), and the estimated pickup time ("Estimated Pickup Time: 7:02 PM") for transportation vehicle 156. Similarly, the additional transportation information 712 indicates the number of seats available ("Seats Available: 2") and the number of seats occupied ("Seats Occupied: 0") for transportation vehicle 152.

The mobile transportation-accepting ICN node may receive, via its user interface (e.g. touch screen display, and/or one or more keys or keypad), a user input indicating an acceptance of a transport and/or the selection of a route (step 412 of FIG. 4). The passenger or user may select any transportation or route that will pass at or near its current location, destined in the same or similar direction, and/or destined to the same or similar location. For example, the mobile transportation-accepting ICN node may receive a user input indicating an acceptance of the transport offered by mobile transportation-offering ICN endpoint device 156 of transportation vehicle 156 and/or the selection ROUTE A (see FIG. 7).

Referring back to FIG. 4, in response to receiving the user input and/or selection in step 414, the mobile transportation-accepting ICN node may send, in the ICN network via the fixed-located ICN node, one or more response messages indicating the selected acceptance of the transport and/or the selection of the route (step 414 of FIG. 4). The selected route may be one of the current anticipated transportation routes or additionally indicate an extension to such route.

The one or more response messages may include passenger or item information associated with the passenger or item to be transported. The passenger or item information may identify or indicate the passenger or item. The passenger or item information may additionally include current location information of the passenger or item. The current location information may be or include a current location or geolocation of the passenger or item (e.g. with use of a GPS module). In some implementations, passenger information may be or include user profile information of a user profile of a user of the mobile transportation-accepting ICN node (i.e. the passenger to be transported). The user profile information may be or include a user name, a user age, a user photo, as examples.

The passenger or item information may also include passenger or item requirement information associated with the passenger or item. The passenger or item requirement information may indicate the needs of the passenger or item to be transported. The passenger or item requirement information may be or include seat or space requirement information. This information may also be input or selected at the user interface. The seat or space requirement information may indicate the seat or space requirement of the passenger (s) or item(s) to be transported. The seat or space requirement information may be or include a number of seats/spaces needed for the passenger(s) or item(s).

In response to receiving the one or more response messages from the mobile transportation-accepting ICN node, the mobile transportation-offering ICN endpoint device may update its current transportation route information and its additional transportation information. See e.g. FIG. 7, the updated current transportation route information 504 with an extension (i.e. the extended route) and the updated additional transportation information 710' (e.g. "Seats Available: 1"; "Seats Occupied: 2; "Estimated Pickup Time: 7:05 PM").

After step 414, the method of FIG. 4 may proceed back to step 404 of the flowchart 400 for repeating actions of the method. This concludes the discussion regarding the method of FIG. 4.

Figure 8:
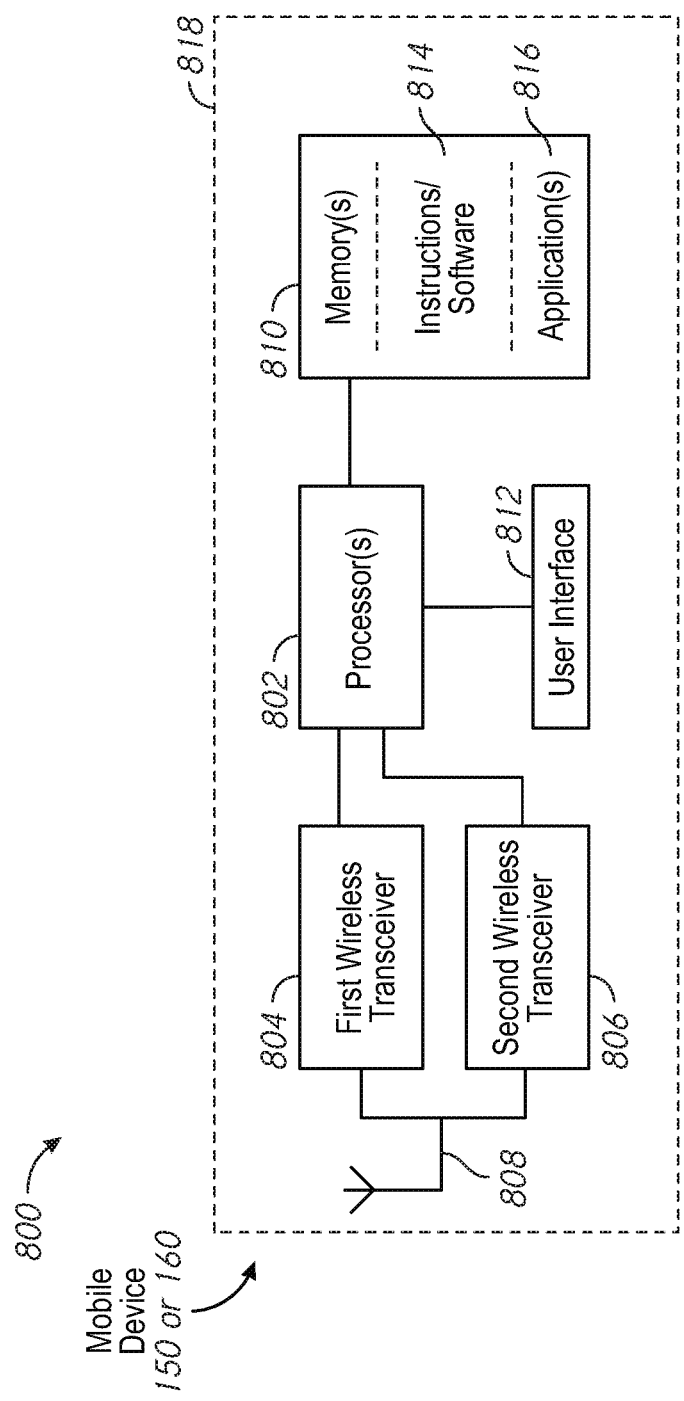
FIG. 8 is a schematic block diagram a mobile communication device which may be configured as a mobile transportation-offering ICN endpoint device or a mobile transportation-accepting ICN node according to the present disclosure.

FIG. 8 is a schematic block diagram 800 of a mobile communication device which may be configured as a mobile transportation-offering ICN endpoint device or a mobile transportation-accepting ICN node according to the present disclosure (e.g. mobile device 150 or 160 of FIGS. 1-2).

In the example of FIG. 8, mobile device 150/160 is shown to have components including one or more processors 802, a first wireless transceiver 804, a second wireless transceiver 806, one or more antennas 808, a memory 810, and a user interface 812. The components of mobile device 150/160 may be provided together as a single unit and, for example, contained and/or carried in a housing 818. User interface 812 may include one or more of a keypad, one or more keys, a visual display, a touch screen display, etc.

The one or more processors 802 may be coupled to first and second wireless transceivers 804 and 806, memory 810, and user interface 812. Memory 810 may store instructions 814 for operation, as well as one or more applications 816. The one or more processors 802 are configured to operate according to the instructions 814 to perform basic device operations as well as to perform techniques of the present disclosure.

First and second wireless transceivers 804 and 806 are coupled to the one or more antennas 808 for wireless communications. One or more processors 802 are configured to operate first wireless transceiver 804 to provide wireless communications in accordance with a first communication protocol or standard, and configured to operate second wireless transceiver 806 to provide wireless communications in accordance with a second communication protocol or standard. The first communication protocol may be any suitable cellular telecommunications protocol or standard described in one of several various specifications. The second communication protocol may be a Wi-Fi or WLAN protocol, which may be described in a group of specifications developed by the Institute of Electrical and Electronics Engineers (IEEE) referred to collectively as the IEEE 802.11 standard. This configuration is merely one example; numerous other configurations may be employed.

Thus, techniques in an information-centric network (ICN) for facilitating the transport of passengers or items have been described. In one illustrative example, a first mobile device may be configured to operate as a mobile transportation-offering ICN endpoint device and operate to connect to one of a plurality of fixed-location ICN nodes in a ICN network. The first mobile device may communicate in the ICN network one or more interest packet messages indicating an interest in a passenger or item to transport. The interest in the passenger or item to transport may be indicated in a Named Data Object (NDO) of an interest packet message. The one or more interest packet messages may include current transportation route information indicating a current anticipated route of transportation for a current passenger or item associated with the first mobile device. The first mobile device may receive, from a second mobile device configured to operate as a mobile transportation-accepting ICN node, one or more response messages indicating an acceptance of the transport.

In another illustrative example, a first mobile device may be configured to operate as a mobile transportation-accepting ICN node and operate to connect to one of a plurality of fixed-location ICN nodes in the ICN network. The first mobile device may receive, from a second mobile device configured to operate as a mobile transportation-offering ICN endpoint device, one or more interest packet messages indicating an interest in a passenger or item to transport. The interest in the passenger or item to transport may be indicated in a Named Data Object (NDO) of an interest packet message. The one or more interest packet messages may include current transportation route information indicating a current anticipated route of transportation for a current passenger or item associated with the second mobile device. In response to a user input, the second mobile device may send, via the fixed-located ICN node, one or more response messages indicating an acceptance of the transport.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method in an information-centric network (ICN) comprising:
at a first mobile device configured to operate as a mobile transportation-offering ICN endpoint device,
connecting to a first fixed-location ICN node of a plurality of fixed-location ICN nodes within a range of the first mobile device in the ICN;
generating one or more interest packet messages indicating an interest in a passenger or item to transport;
sending, as the mobile transportation-offering ICN endpoint device, in the ICN network via the first fixed-location ICN node, the one or more interest packet messages indicating the interest in the passenger or item to transport;
receiving, from a second mobile device configured to operate as a mobile transportation-accepting ICN node, one or more response messages indicating an acceptance of the transport; and
directing the transport of the passenger or item including joining the ICN by connecting to a second fixed-location ICN node of the plurality of fixed-location ICN nodes within the range of the first mobile device.

2. The method of claim 1, wherein the interest in a passenger or item to transport is indicated in a Named Data Object (NDO) of an interest packet message.

3. The method of claim 1, further comprising:
at the first mobile device,
maintaining current transportation route information which defines a current anticipated route of transportation for a current passenger or item associated with the first mobile device.

4. The method of claim 1, wherein the one or more interest packet messages comprise current transportation route information indicating one or more fixed-location ICN nodes along a current anticipated route of transportation for a current passenger or item associated with the first mobile device.

5. The method of claim 1, further comprising:
at the first mobile device,
maintaining current transportation route information which defines a current anticipated route of transportation for a current passenger or item associated with the first mobile device, wherein the one or more interest packet messages indicate the current transportation route information which defines the current anticipated route of transportation.

6. The method of claim 1, further comprising:
at the first mobile device,
after receiving the one or more response messages indicating an acceptance of the transport, maintaining storage of current transportation route information indicating a current anticipated route of transportation for a current passenger or item; and
sending, in the ICN network, one or more additional interest packet messages indicating an interest in an additional passenger or item to transport, wherein the one or more additional interest packet messages comprise the current transportation route information indicating the current anticipated route of transportation.

7. The method of claim 1, further comprising:
at the first mobile device,
connecting to another one of the plurality of fixed-location ICN nodes in the ICN network; and
sending, in the ICN network via the other fixed-location ICN node, one or more additional interest packet messages indicating an interest in another passenger or item to transport.

8. The method of claim 1, wherein the one or more interest messages include at least one of: user profile information associated with the first mobile device, seat or space occupancy information indicating a number of occupied seats or spaces, seat or space availability information indicating a number of available seats or spaces, and estimated transportation information.

9. The method of claim 1, wherein the second mobile device is connected to the first and second fixed-location ICN node as an ICN leaf node in the ICN network.

10. A mobile device, comprising:
a wireless transceiver;
one or more processors coupled to the wireless transceiver;
the one or more processors configured to operate the mobile device as a mobile transportation-offering information-centric network (ICN) endpoint device by:
connecting, via the wireless transceiver, to a first fixed-location ICN node of a plurality of fixed-location ICN nodes within a range of the first mobile device in an ICN network;
generating one or more interest packet messages indicating an interest in a passenger or item to transport;
sending, as the mobile transportation-offering ICN endpoint device, in the ICN network via the first fixed-location ICN node, the one or more interest packet messages indicating the interest in the passenger or item to transport;
receiving, from another mobile device configured to operate as a mobile transportation-accepting ICN node, one or more response messages indicating an acceptance of the transport; and
directing the transport of the passenger or item including joining the ICN by connecting to a second fixed-location ICN node of the plurality of fixed-location ICN nodes within the range of the first mobile device.

11. The mobile device of claim 10, wherein the one or more processors are further configured to send one or more interest packet messages including current transportation route information corresponding to a current anticipated route of transportation for a current passenger or item associated with the mobile device.

12. The mobile device of claim 10, wherein the one or more processors are further configured to:
after receiving the one or more response messages indicating an acceptance of the transport, maintaining storage of current transportation route information indicating a plurality of fixed-location ICN nodes along a current anticipated route of transportation for a current passenger or item; and
send, in the ICN network, one or more additional interest packet messages indicating an interest in an additional passenger or item to transport, wherein the one or more additional interest packet messages comprise the current transportation route information indicating the current anticipated route of transportation.

13. A method in an information-centric network (ICN) comprising:
at a first mobile device configured to operate as a mobile transportation-accepting ICN node,
connecting to a fixed-location ICN node of a plurality of fixed-location ICN nodes within a range of the first mobile device in the ICN network;
receiving, via the fixed-location ICN node, from a second mobile device configured to operate as a mobile transportation-offering endpoint device, one or more interest packet messages indicating an interest in a passenger or item to transport;
generating one or more response messages indicating an acceptance of the transport;
sending, via the fixed-location ICN node, the one or more response messages indicating the acceptance of the transport; and
directing the transport of the passenger or item from the fixed-location ICN node.

14. The method of claim 13, further comprising:
at the first mobile device,
connecting to the fixed-location ICN node as an ICN leaf node in the ICN network.

15. The method of claim 13, further comprising:
at the first mobile device,
receiving a user input indicating an acceptance to the interest in the transport of the passenger or item; and
wherein the sending of the one or more response messages is performed in response to receiving the user input.

16. The method of claim 13, wherein the one or more interest packet messages include current transportation route information corresponding to a current anticipated route of transportation.

17. The method of claim 13, wherein the one or more interest messages include at least one of: user profile information associated with the other mobile device, seat or space occupancy information indicating a number of occupied seats or spaces, and seat or space availability information indicating a number of available seats or spaces.

18. The method of claim 13, wherein the one or more interest packet messages comprise one or more first interest packet messages, and the method further comprises:
at the first mobile device,
receiving, from another mobile device configured to operate as a mobile transportation-offering endpoint device, one or more second interest packet messages indicating an interest in a passenger or item to transport;
receiving a user input indicating an acceptance to the interest in the transport of the passenger or item for the one or more first interest packet messages or the one or more second interest packet messages; and
wherein the sending of the one or more response messages is performed in response to receiving the user input.

* * * * *